US012747102B2

(12) United States Patent
Branner et al.

(10) Patent No.: US 12,747,102 B2
(45) Date of Patent: Sep. 29, 2026

(54) SHUTTLE SYSTEM AND METHOD FOR OPERATING SHUTTLE SYSTEM BY MEANS OF A CONTROL DEVICE

(71) Applicant: Gebhardt Fördertechnik GmbH, Sinsheim (DE)

(72) Inventors: Fabian Branner, Waibstadt (DE); Marco Gebhardt, Sinsheim (DE); Wilfried Kugler, Ingersheim (DE)

(73) Assignee: Gebhardt Fördertechnik GmbH, Sinsheim (DE)

( * ) Notice: Subject to any disclaimer, the term of this patent is extended or adjusted under 35 U.S.C. 154(b) by 474 days.

(21) Appl. No.: 18/230,013

(22) Filed: Aug. 3, 2023

(65) Prior Publication Data

US 2024/0043209 A1 Feb. 8, 2024

(30) Foreign Application Priority Data

Aug. 5, 2022 (DE) ..................... 10 2022 119 780.8

(51) Int. Cl.
*B65G 1/00* (2006.01)
*B65G 1/04* (2006.01)
*B65G 1/137* (2006.01)

(52) U.S. Cl.
CPC ........... *B65G 1/0492* (2013.01); *B65G 1/137* (2013.01)

(58) Field of Classification Search
USPC .............................. 700/11, 12, 14, 245–264
See application file for complete search history.

(56) References Cited

U.S. PATENT DOCUMENTS 8,718,814 B1 * 5/2014 Clark ..................... G06Q 10/08 700/214
8,798,784 B1 * 8/2014 Clark ........................ G06F 7/00 700/214
9,378,482 B1 * 6/2016 Pikler .................. B65G 1/1378
9,452,886 B2 * 9/2016 Yamashita ........... B65G 1/1378
11,554,917 B2 * 1/2023 Stevens ................ B65G 1/1375
(Continued)

FOREIGN PATENT DOCUMENTS

CN 109677830 A 4/2019
CN 111994535 B 11/2020
(Continued)

OTHER PUBLICATIONS

German Office Action, DE10 2022 119 780.8, dated Apr. 17, 2023 (w_translation).

(Continued)

*Primary Examiner* — Jonathan L Sample
(74) *Attorney, Agent, or Firm* — Reising Ethington P.C.

(57) ABSTRACT

A method and system for operating a shuttle system by a control device are disclosed. The shuttle system comprises a rack with a driveway and a multi-deep storage channel with at least two storage locations. In embodiments, the shuttle system comprises at least two shuttles arranged to store, retrieve, or transfer conveyed goods; the shuttles receive orders from the control device. Once an active order for a conveyed good in a specific storage channel is present, the control device checks whether an open order for storing, retrieving, or transferring in this storage channel is present. If no open order is present, the control device places the active order. If an open order is present, the control device either assigns the active order only after the open order has been completed, or modifies the active order so that a storage channel is selected for which no open order is present.

8 Claims, 7 Drawing Sheets

(56) References Cited

U.S. PATENT DOCUMENTS

| | | | | |
|---|---|---|---|---|
| 12,421,041 | B2 * | 9/2025 | Nguyenquang | B65G 1/065 |
| 2016/0355337 | A1 * | 12/2016 | Lert | B65G 1/0492 |
| 2017/0203921 | A1 * | 7/2017 | Issing | B65G 1/0407 |
| 2017/0313514 | A1 * | 11/2017 | Lert, Jr. | B65G 1/0492 |
| 2018/0096299 | A1 * | 4/2018 | Jarvis | G06Q 10/0875 |
| 2019/0270591 | A1 * | 9/2019 | Lert, Jr. | B65G 1/0435 |
| 2020/0207250 | A1 * | 7/2020 | Jarvis | G01C 21/3623 |
| 2020/0385211 | A1 * | 12/2020 | Yamashita | G06Q 10/087 |
| 2021/0130098 | A1 * | 5/2021 | Meurer | B65G 1/1378 |
| 2022/0388783 | A1 * | 12/2022 | Wintz | G06Q 10/087 |
| 2022/0391828 | A1 * | 12/2022 | Wintz | G06Q 10/0633 |
| 2023/0211952 | A1 * | 7/2023 | Liu | B65G 1/1373 700/216 |

FOREIGN PATENT DOCUMENTS

| | | | | |
|---|---|---|---|---|
| CN | 112027473 | A | 12/2020 | |
| DE | 102020133408 | B3 | 3/2022 | |
| EP | 3183190 | B1 | 6/2017 | |
| JP | 2018115071 | A | 7/2018 | |
| JP | 2020040747 | A | 3/2020 | |
| JP | 2020040748 | A | 3/2020 | |
| JP | 2021151912 | A | 9/2021 | |
| WO | WO-2017197121 | A1 * | 11/2017 | B65G 1/0492 |
| WO | WO-2022219066 | A2 * | 10/2022 | B64F 1/36 |

OTHER PUBLICATIONS

Extended European Search Report, EP23189634.1, dated Dec. 20, 2023 (w_translation).

Machine translation JP2021151912.

European Office Action, EP23189634.1, dated Sep. 1, 2025 (w_translation).

* cited by examiner

| | storage operation according to step a1 [storage operation; storage location] | | Impends low storage density? | impends blockade situation? | possible modifications | | |
|---|---|---|---|---|---|---|---|
| | Shuttle 7A | Shuttle 7B | | | 1 | 2 | 3 |
| #1 | ON; X | ON; 2 | YES | NO | YES | YES | YES |
| #2 | ON; 3 | | YES | YES | YES | YES | YES |
| #3 | ON; 3 | ON; X | NO | YES | YES | YES | YES |
| #4 | ON; X | | NO | NO | not necessary | | |
| #5 | ON; 3 | OFF; 3 | NO | YES | YES | NO | NO |
| #6 | ON; X | | NO | YES | YES | NO | NO |
| #7 | OFF; 4 | ON; 4 | NO | YES | YES | NO | YES |
| #8 | | ON; X | NO | YES | YES | NO | YES |
| #9 | OFF; 4 | OFF; 5 | NO | YES | YES | YES | NO |

Fig. 9

SHUTTLE SYSTEM AND METHOD FOR OPERATING SHUTTLE SYSTEM BY MEANS OF A CONTROL DEVICE

CROSS-REFERENCE TO RELATED APPLICATION

This application claims priority to German Patent Application No. DE 10 2022 119 780.8, filed on Aug. 5, 2022, the contents of which are hereby incorporated by reference in its entirety.

TECHNICAL FIELD

The invention relates to a shuttle system and a method for operating a shuttle system, including a shuttle system and method for operating a shuttle system by means of a control device.

BACKGROUND

Methods for operating shuttle systems by means of control devices are known from the prior art. With known methods, blockage situations and/or a non-optimal utilization of the storage locations, i.e. a low storage density, can occur.

SUMMARY

An object of the present invention is to overcome one or more disadvantages associated with the prior art.

Aspects and features of the inventive concept are disclosed herein.

Embodiments of the present invention comprise several alternative methods. These methods have in common that they serve to operate a shuttle system by means of a control device. The shuttle system may comprise a rack, sometimes also referred to as a storage, with a driveway and a preferably multi-deep storage channel, which in turn may comprise at least two storage locations, i.e. is at least double-deep. Furthermore, the shuttle system may comprise at least two shuttles, which are arranged to store, retrieve or transfer storage or conveyed goods. The shuttles receive orders for storing, retrieving or transferring a stored or conveyed good from the control device.

The shuttles are may be horizontally moving vehicles for storing, retrieving and transferring conveyed goods, which are used for example in a channel storage system. In embodiments, they can be vehicles that can move independently and only horizontally. The lifts described in more detail below can also move the shuttles vertically, i.e. in particular enable a change of level.

The goods to be stored or conveyed can be pallets. The shuttle system can be designed as a pallet storage system.

Regardless of whether the goods in question are currently being transported, have already been stored, or are present in some other state, in the following, for the sake of simplicity, we may refer only to "transported goods" instead of "stored or transported goods".

The shuttle system may comprise a rack with numerous driveways and a plurality of preferably multiple-deep storage channels, each having two, three, four or more storage locations. Preferably, the rack of the shuttle system is designed as a channel storage, such as a pallet channel storage.

The shuttle system can comprise aisles, which are basically known from the intralogistics.

The rack can comprise at least one, but preferably also several levels, which each comprise driveways and storage channels that are served and driven by the shuttles.

The shuttle system may be set up in such a way that it is basically possible, and thus there is basically a risk, that two shuttles receive an order for the same storage channel at the same time and attempt to execute it substantially simultaneously. For example, if the rack comprises several levels, there may be the possibility and thus the risk that two shuttles move simultaneously in the same level and attempt to execute an order for the same storage channel.

In general, the rack may include a plurality of driveways and a plurality of storage channels, often and especially preferably situated at right angles to these driveways with two, three, four or more storage locations. If main driveways as well as connecting paths between these main driveways are present in the storage, the storage channels may be situated at right angles to the main driveways. The connecting paths may also be situated at right angles to the main driveways.

The storage channel(s) can have a channel entrance. A channel end, which is usually opposite the channel entrance, can be designed as a dead end.

Alternatively, the storage channel can have two channel entrances and be accessible from both sides. Such storage channels can also be used as connecting paths between the main driveways. For this purpose, unloaded shuttles can also pass underneath any conveyed goods deposited in the storage channel. Furthermore, a loaded shuttle can enter the storage channel through one of the channel entrances and leave it again through the opposite channel entrance after it has deposited its conveyed goods. When retrieving a conveyed good, the same applies, provided that there are no storage locations occupied by conveyed goods between the storage location where the conveyed good is picked up and the channel entrance intended for the shuttle's exit.

In the case of a dead-end storage channel, an entry direction is the direction from the channel entrance to the channel end.

In the case of a storage channel that can be entered from both sides, the entry direction is the direction from the channel entrance through which the shuttle enters the storage channel to the opposite channel entrance. In this example, the entry direction is reversed when the shuttle uses the opposite channel entrance for entry.

The conveyed goods can be presented to the shuttles at a transfer station, interface or the like. For example, a pre-storage zone can be assigned to the rack, sometimes also referred to as a storage, over which the conveyed goods are fed into the rack. Furthermore, it may be thought of assigning floor conveyors, in particular automated guided vehicle systems (AGVs), to the shuttle system. AGVs can transfer the conveyed goods to the shuttles in a pre-storage zone, at suitable transfer stations or in other suitable ways. It can also be considered that the conveyed goods are transferred to the shuttles over any means of conveyor technology or generally fed into the rack; for example, cranes, hoists, trackless floor conveyors such as forklifts, continuous conveyors such as belt conveyors, rail systems, roller conveyors, chain conveyors or the like can be considered here.

The inventors recognized that in the prior art, it depended on a point in time when the order was placed and on a point in time when the storage location to be controlled for the storage operation to be performed was determined, whether blockage situations or a low storage density occurred. If the order was already placed when the conveyed goods were picked up by the AGV and the storage location was already specified herein, the arrival time of the conveyed goods at the target channel, i.e. at the storage channel to be approached by the shuttle according to the order, could be influenced by the following factors: delays that occur during the transport of the conveyed goods by the shuttle; delays occurring during or in connection with the transfer of the conveyed goods to the shuttle, and delays occurring during the shuttle's journey to the destination channel. The aforementioned delays could add up, further increasing the risk of blockage situations.

The methods according to the present invention are particularly suitable for preventing blockage situations and low storage densities in shuttle systems to which automated guided vehicle systems (AGVs) are assigned, i.e. in which the conveyed goods are transferred in particular from an AGV to a shuttle. This transfer can be direct or indirect.

However, the methods of the present invention are also suitable for preventing blockage situations and excessively low storage densities in shuttle systems without a pre-zone as well as in shuttle systems with a pre-zone in which any means of conveyor technology, i.e. not necessarily AGVs, are used.

Preferably, the methods according to the present invention prevent or avoid blockage situations and excessively low storage densities. There may be cases of application in which it is sufficient if the aforementioned problems occur with a significantly lower frequency, i.e. are merely avoided but not prevented. However, there may also be applications in which the aforementioned problems must be completely prevented. Furthermore, most of the variants of the methods prevent or avoid both blockage situations and low storage densities. However, some of the variants only prevent or avoid either blockage situations or too low storage densities. However, preventing or avoiding blockage situations alone, in particular, can significantly increase the efficiency and throughput of a shuttle system.

The control device can be any device for controlling a storage, which may also be of simple design. The control device can consist of the software components necessary for controlling the storage and the hardware components necessary for its function.

Preferably, however, a control device is a complex and superordinate system.

The control device can be, for example, a storage management system. A storage management system is preferably a system for controlling, monitoring and optimizing a storage. Storage management systems are sometimes also referred to as warehouse management systems. Preferably, a storage management system is a complex and higher-level system that also serves to control and optimize the storage and may consist primarily of the software components required for this purpose and the hardware components required for its function.

However, the term control device also includes a system that is superordinate to the storage management system and consists of the storage management system and other components such as an enterprise resource planning system (ERP system), a material flow system and programmable logic controllers (PLCs). The material flow system and the PLCs can be subordinate to the storage management system herein.

Storing preferably means depositing a conveyed good in a storage location in a storage channel, in particular by a shuttle. Retrieval preferably means picking up a conveyed good that is in a storage location in a storage channel, preferably by a shuttle. A transfer means a picking up of a conveyed good, which is standing in a storage location in a storage channel, and a subsequent transfer of this conveyed good to another location within the storage.

An order preferably means an instruction that a shuttle receives directly or indirectly from the control device. Preferably, the order specifies at least the storage operation to be performed, i.e. whether storing, retrieving or transferring is to take place, as well as the storage channel in which this storage operation is to be performed. In some embodiments of some of the methods according to the invention, the order may also additionally specify the storage location within the storage channel at which the storage operation is to be performed.

In the context of the present invention, an "active order" is preferably an order, which already exists in the control device but has not yet been delegated, in particular has not yet been assigned to a shuttle. In the context of the present invention, delegating an order preferably means delegating it to a shuttle.

An "open order" is preferably an order which has already been assigned to a shuttle, but which has not yet been processed, i.e. completed, by the shuttle. In the context of the present invention, it may be considered that even open orders can still be modified by the control device.

A "completed order" is an order that has been processed by the shuttle, i.e. completed.

An order consisting of storing a conveyed good can be considered completed in particular when the conveyed good has been placed in a storage location and the shuttle has left the respective storage channel again.

In particular, an order consisting of retrieving a conveyed good can be considered completed at the earliest when the conveyed good has been picked up and the shuttle has left the respective storage channel again. However, according to an alternative embodiment, this order can also be considered completed only when the conveyed good to be retrieved has been stored or parked at another location or has been transferred to an AGV or a member of the conveyor system, such as a chain conveyor or a belt conveyor. The same applies to an order consisting of a transfer of a conveyed good.

An order placement, i.e. in particular the delegation of an active order by the control device to a shuttle so that the previously active order is present as an open order, can in some variants of the methods according to the invention already specify the storage location to be selected. In other variants, only the storage channel to be selected, but not the storage location within this storage channel, is fixed at the time the order is placed.

A blockade situation means, for example, a situation in which a first shuttle is to perform a storage operation at a specific storage location in accordance with an order, wherein a second shuttle has previously deposited, in particular stored, a conveyed good in a storage location located between this storage location and the channel entrance to be used by the shuttle. The first shuttle cannot perform the storage operation at the storage location according to the order because it would have to pass through the storage location that is already occupied and located between the channel entrance to be used and the storage location according to the order, which is occupied by the conveyed good previously deposited there by the second shuttle. Such a blockage situation can occur, for example, if two shuttles arrive at the storage channel, in particular at the channel entrance, in a different order than predicted. Generally, in the context of the present invention, a blockage situation can be understood as a situation in which the performance of a storage operation by one of two shuttles results in the other shuttle being unable to perform its storage operation. Such a blockage situation may be temporary and may be resolved, for example, by a shuttle arriving "too late" to perform its storage operation. However, such a blockage situation can also be permanent in the sense that, once it has occurred, it could only be solved without modifying at least one order by undoing the storage operation that causes the blockage situation. Both variants, i.e., intermittent and permanent blockage situations disrupt the operation of a shuttle system and reduce its efficiency. Both blockage situations can be prevented by the methods according to the present invention.

A prerequisite for automatically unblocking a temporary blockage situation after the arrival of the "delayed" shuttle may be that the "non delayed" shuttle either does not enter the storage channel because, for example, it detects with its on-board devices such as sensors or the like or is informed that a blockage situation has occurred. Alternatively, the "non delayed" shuttle may enter the storage channel but leave it once it has determined or been told that a blockage situation has occurred. In either case, automatic resolution of the blockage situation may require that the "non delayed" does not wait in the storage channel and does not block the channel entrance.

A low storage density preferably means a situation in which there is an unoccupied, i.e. free storage location between two occupied storage locations within a storage channel. In order to increase the storage density from such a situation, one of the conveyed goods located in one of the occupied storage locations has to be retrieved or transferred so that a conveyed good can be stored in the free storage location. Such retrieving or transferring is cumbersome and time-consuming. However, as long as it does not take place, the free storage location described above cannot be used. Therefore, a low storage density should be avoided.

The shuttle system can be designed as a level-bound system and can comprise one or preferably several levels. Optionally, aisles can be present. In each case, there are preferably at least two shuttles per level. These shuttles can preferably move along the main driveways and transversely to these main driveways, i.e. arbitrarily within the levels. Such a system may include lifts for the conveyed good, especially if there are multiple levels. Such level-bound shuttle systems are preferably used within the context of the present invention if they comprise at least two shuttles in at least one level.

The shuttle system may alternatively be designed as an aisle-bound system and comprise one or preferably more levels and one or preferably more aisles. In such a system, the shuttles can move horizontally and vertically within the aisles, but cannot change the aisles. Thus, horizontal movement of the shuttles is limited to the respective associated aisle. Such a system may include lifts for the shuttles to allow the shuttles to change levels. Such aisle-bound shuttle systems are preferably used in the context of the present invention if they comprise at least two shuttles.

In the level-bound system and in the aisle-bound system, the shuttles preferably have two degrees of freedom of movement.

The shuttle system may also be designed as an aisle- and level-bound shuttle system. Such aisle- and level-bound shuttle systems are preferably used in the context of the present invention when they comprise at least two shuttles.

Furthermore, the shuttle system may be designed as an unbound shuttle system and may comprise one or preferably more levels. Optionally, aisles may be provided. In such a system, lifts may be provided for the shuttles, allowing them to move in a vertical direction. Driveways transverse to the main driveways or transverse to any aisles provide the shuttles with three degrees of freedom of movement in an unbound system. Unbound systems allow a high degree of flexibility. The throughput of unbound shuttle systems can be increased by inserting additional shuttles.

In principle, blockage situations and a low storage density can be present in all shuttle systems described above and can be prevented by the methods according to the present invention. Since additional shuttles in unbound systems also increase the chances of blockage situations occurring, the present invention can be applied in a particularly advantageous manner in unbound systems.

The method according to the invention can be used in shuttle systems in which the movement of the shuttles is at least partially dynamic and dynamic traffic control is used, for example. Changes in an expected travel time of a shuttle to a storage channel to be controlled as part of the order to be executed can occur, for example, if this shuttle encounters an obstacle during travel, for example another shuttle crossing its path, and brakes. Furthermore, changes in the expected travel time can be present in the event of malfunctions. For example, the relating shuttle itself may have a malfunction that extends the travel time. Furthermore, another shuttle may be unable to travel on the planned route due to a malfunction, which requires a change of route. Furthermore, a lift used for the level change may have a malfunction. Furthermore, a change in the expected travel time can also be present if a manual intervention has to take place, for example after performing a contour or weight check.

Due to such changes in the expected travel time, which are often difficult to foresee, blockage situations can be present particularly often because two shuttles with orders for the same storage channel then arrive there approximately at the same time, contrary to the calculations performed. This applies all the more to cases in which a responsible control device, for example a very simply designed control device, does not perform any such calculations at all.

The subsequent described alternative methods according to the present invention each serve to prevent a blockage situation and/or to increase a storage density. The preceding details herein apply to all methods according to the present invention.

The methods described subsequently generally do not require any modifications, hardware conversions or the like, and can therefore be implemented in existing shuttle systems in a simple manner.

All of the methods described below can serve to operate a shuttle system by means of control devices, wherein the shuttle system can comprise a rack having a driveway and a preferably multiple-deep storage channel having at least two storage locations. Furthermore, the shuttle system can comprise at least two shuttles, wherein the shuttles can be set up to store, retrieve or transfer conveyed goods, wherein the shuttles receive orders for storing, retrieving or transferring a conveyed good from the control device. In order to prevent a blockage situation and/or to increase the storage density, the steps of the methods described below can be performed.

According to a first method, the following steps are performed to increase the storage density and/or to prevent blockage situations:

As soon as an active order for storage, retrieval or transfer of a conveyed good is present with respect to a specific storage channel, the control device checks whether an open order for storage, retrieval or transfer with respect to this storage channel is present.

If no such open order is present, the control device places the active order.

If such an open order is present, the control device either assigns the active order only after the open order has been completed, or the control device modifies the active order so that a storage channel is selected for which no open order is present.

According to an embodiment of the first method, the control device assigns the active order if and as soon as no open order concerning the same storage channel is present. The control device thus waits until any open order concerning the same storage channel has been executed.

According to a further embodiment of the first method, the control device modifies the active order by selecting an alternative storage channel.

In both of the aforementioned cases, the storage location in the storage channel is preferably also assigned with the order placement or modification of the order.

A prioritization to either preferentially wait or preferentially modify the order if an open order is already present for a contemplated storage channel can be made based on various aspects and depend on numerous factors of the shuttle system.

For example, such a decision may be made based on a comparison of an expected waiting time to complete the open order and a difference from an expected travel time to an alternative storage channel. If an available alternative storage channel is significantly further away than the originally considered channel and if the open order relating to the originally considered channel is expected to be completed in a short time, then it may be waited. Otherwise, the order may be modified.

Further variants are conceivable.

If no open order is present, the control device assigns the active order preferably at the next possible point in time according to the first alternative of the first method. The "next possible time" here means preferably a suitable time as soon as possible.

Since for each storage channel, i.e. with regard to all storage locations of this storage channel, only one open order can exist at any given time, no blockage situations and also no storage densities that are too low can occur. Finally, these occur in particular when two shuttles each execute an open order relating to the same storage channel in a given time period.

This presupposes, of course, that the orders placed one after the other are planned in such a way that no blockage situations occur when the orders are performed consecutively without overlapping in time. A control system will usually assign the orders in such a way that neither blockade situations nor too low storage densities occur or are to be expected.

According to a second method, the following steps are performed to increase the storage density and/or to prevent blockage situations:

A shuttle receives an order for storing a conveyed good, wherein this order specifies the storage channel to be approached, but not the storage location.

Immediately before the shuttle enters the storage channel, the order is specified in such a way that the shuttle is informed of the storage location where the conveyed good is to be stored.

Here, "immediately before the shuttle enters the storage channel" means, for example, "at the earliest or exactly when the shuttle enters a main driveway directly adjacent to the storage channel to be approached", i.e., at the "penultimate" turn of the shuttle before entering the storage channel.

Further, "immediately before the shuttle enters the storage channel" can also mean "at the earliest or immediately after the shuttle is three, two, or one shuttle length away from the channel entrance of the storage channel".

Further, "immediately before the shuttle enters the storage channel" can also mean "at the earliest or immediately after the shuttle is five or three or one meter away from the channel entrance of the storage channel".

Furthermore, "immediately before the shuttle enters the storage channel" can also mean "at the earliest or exactly when the shuttle is expected to arrive at the channel entrance in ten, five or two seconds".

Furthermore, "immediately before the shuttle enters the storage channel" can also mean "at the earliest or immediately at an order progress of at least or exactly 90%, 95% or 99% in terms of the time expected to be required for the order".

Furthermore, "immediately before the shuttle enters the storage channel" can also mean "at the earliest or immediately when a front edge or side of the shuttle pointing in the direction of travel is at a height of the storage channel". Herein, "at a height of the storage channel" means that the shuttle moving along, for example, the main driveway towards the storage channel arrives at a point where the storage channel and the main driveway intersect.

In general, "immediately before the shuttle enters the storage channel" can also mean "arrival of the shuttle at the channel entrance of the storage channel".

In the following, when referring to the arrival of the shuttle at the channel entrance with respect to the second method, the corresponding explanations also apply to all alternatives described above.

Between the order placement and the arrival at the channel entrance, the shuttle can travel to the storage channel specified according to the order, i.e. move through the rack to the storage channel.

Thus, according to the second method, the storage location within the storage channel to be approached is not yet specified before the shuttle arrives at the storage channel.

If a conveyed good is stored in the storage channel between the time the order is placed with the shuttle and the time the shuttle arrives at the storage channel, this does not lead to a blockade situation. Such a blockade situation would only occur if the storage location within the storage channel to be approached was already determined when the order was placed or at least well before the arrival of the shuttle at the storage channel. If, on the other hand, the storage location is determined and communicated to the shuttle only after the shuttle has arrived at the storage channel, no other shuttle can store another conveyed good in the same storage channel between this specification of the order and the storing, if the storage channel is designed as a dead end. According to the second method, the availability of the storage location cannot change in such a storage channel after the order has been specified with regard to the storage location, since the relating shuttle is already at the channel entrance and ready to enter the storage channel.

If the storage channel is not designed as a dead end, the danger of a blockage situation only exists if one shuttle arrives from each side at essentially the same time and these shuttles are to perform conflicting orders where a blockage situation can arise. However, such an essentially simultaneous arrival is very unlikely.

Nevertheless, within the context of the second method for shuttle systems with storage channels that can be accessed from both sides, it can be considered that before the specification it is checked whether there is still a shuttle in the relating storage channel. If this is the case, the order can be specified, for example, only after the shuttle still in the storage channel has left the storage channel. Preferably, at the latest after the shuttle still in the storage channel has left it, the control device also receives information about the storage operation performed in the storage channel and can take this into account when specifying the order for the shuttle located on front of the storage channel.

Here, even if the storage channel is designed as a dead end, it can be considered that the arriving shuttle waits in front of the channel entrance in such a way that the shuttle still in the storage channel can leave it unhindered.

When the order is placed, the storage location has not yet been finally determined. Nevertheless, a preliminary storage location can be communicated to the shuttle. Thus, according to one embodiment, the specification may be understood as a "final determination" and does not preclude a preliminary determination at an earlier time, i.e., at any time before the arrival at the channel entrance.

If the shuttle has been notified of a preliminary storage location, this storage location can be confirmed during specification after arrival at the channel entrance if, for example, no further conveyed good has been stored in the relating storage channel in the meantime, which could lead to a blockage situation. If in the meantime, i.e. between the preliminary notification of the storage location in the context of the order placement and the arrival of the shuttle at the channel entrance, another conveyed good has been stored in the relating storage channel, the preliminary storage location can be changed to avoid a blockage situation.

If, on the other hand, the shuttle has not been notified of a preliminary storage location, the specification after arrival at the channel entrance is the first and final notification of the storage location to the shuttle.

When the shuttle reaches the storage channel, the control device can inform the shuttle of the storage location where the conveyed good is to be stored. Thus, this is a centrally controlled variant.

Alternatively, there may be a routing system subordinate to the control device, which preferably guides the shuttle to the channel entrance. After the shuttle has reached the channel entrance, the routing system can, for example, request a free storage location within this storage channel from the control device and/or receive a message from the control device about such a free storage location. The shuttle is then notified by the routing system, and thus in a decentralized manner, of the storage location where the conveyed good is to be stored.

Regardless of whether the decentralized or centralized approach is chosen, the storage location that is communicated to the shuttle as the location for storage can usually be the free storage location furthest away from the channel entrance. This applies in any case if the storage channel is designed as a dead end with only one channel entrance. In this way, free storage locations between occupied storage locations within a channel are avoided. Furthermore, a blockage situation is prevented, because when a shuttle arrives at the channel entrance, it is clear which storage location is free, so that the planned storage can be performed.

Also regardless of whether the decentralized or centralized approach is selected, the shuttle can also request a free storage location within this storage channel from any higher-level system, for example from the control device. Thus, in all embodiments, notification of the storage location as part of a specification of the order may be preceded by a corresponding request from the shuttle.

After specifying the storage location, which can be done centrally or decentrally as described above, for example, the shuttle preferably stores the conveyed good in this storage location.

According to one embodiment of the second method, it may be thought of applying the second method to all shuttles of a shuttle system or to all shuttles of one level or to another subset of all shuttles of a shuttle system. Thus, the second method does not necessarily have to be applied to all shuttles of a shuttle system.

Furthermore, it may also be considered to apply the second method only if a second order has been delegated or placed for a storage channel for which an open order is already present. In addition, in such an embodiment, the already open order for this storage channel could be subsequently modified so that it only specifies the storage channel, but no longer the storage location, until the shuttle arrives at the channel entrance.

Although in the second method, just as in the third method described below, the storage location is not yet specified when the order is placed, it is checked, for example by the control device, before the order is placed whether a free storage location is present in the relating storage channel. This is one of the basic tasks of a control device and is preferably practiced both in the second method and in all other methods according to the present invention.

In the second method, it can happen that several orders relating to the same storage channel are performed simultaneously by different shuttles. If in such a case the shuttles do not arrive at the storage channel in the planned order, a blockage situation can occur, which can be eliminated with the second method as described above. Even in situations in which the second method is performed in order to prevent a blockage situation, as a rule only as many storage orders for the storage channel as it has storage locations are assigned in each case. Preferably, therefore, the storage channel is not overcrowded at any time.

If such overcrowding nevertheless occurs, for example due to errors, it may be thought of in the second method that the order is specified not only with regard to the storage location, but also with regard to the storage channel. Thus, it may be thought of directing the shuttle to another channel in such a case.

According to a third method, the following steps are performed to increase the storage density and/or to prevent blockage situations:

A shuttle receives an order for storing a conveyed good, wherein this order specifies the storage channel to be approached, but not the storage location.

The shuttle enters the storage channel and then continues to move within the storage channel.

During this movement, a sensor checks whether the storage locations located on front of the shuttle are free or occupied, If the sensor detects an occupied storage location, the conveyed good is stored in the free storage location directly adjacent to the occupied storage location.

If the sensor does not detect an occupied storage location, the conveyed good is stored in the case of a storage channel designed as a dead end in the last storage location within the storage channel in one entry direction; in the case of a storage channel with two channel entries, the conveyed good is stored in a storage location located in the middle of the storage channel or in the last storage location in the entry direction.

Whether the conveyed good is placed in the middle of a storage channel with two channel entrances or in the last storage location, i.e. directly before the opposite channel entrance, can depend on a storage strategy, for example. Known storage strategies to be considered here are, for example, "first in first out" (FIFO) or "last in first out" (LIFO); the conveyed good to be relocated first can therefore be the conveyed good stored first or last.

After receiving the order and before entering the storage channel, the shuttle can move through the rack to the storage channel.

The movement within the storage channel is preferably in the entry direction.

According to one embodiment of the third method, the shuttle thus preferably enters the storage channel without "knowing" the storage location. A sensor, which can be mounted on the shuttle, can check during this entry whether the storage locations in front of the shuttle are free or occupied, i.e. whether conveyed goods are already stored there or not.

Here, any suitable sensors can be considered. Since common shuttle systems usually provide such sensors as on-board equipment of the shuttles, the third method can be implemented in existing shuttle systems without any hardware modification.

The shuttle may include a single or multiple of such sensors.

If a storage location occupied by a conveyed good is detected, the shuttle preferably places the conveyed good to be stored in the last free storage location in the direction of entry. As already described above, in the case of a storage channel that is not designed as a dead end, it can also be considered to place the conveyed good approximately in the center, which can depend on the storage strategy.

According to one embodiment of the third method, the shuttle is set up to detect or calculate its position within the storage channel and, after successful storage, to communicate the position of the stored conveyed good to the control device. The position can be detected or calculated, for example, by means of a suitable encoder in the shuttle, by detecting a grid or other type of marking on a bottom of the storage channel or by measuring the distance to a known point or surface within the storage channel. Furthermore, holes can be located at regular intervals within a rail in the storage channel on which the shuttle moves in the storage channel. These holes are detected and counted by a sensor so that a driveway in the storage channel and thus the position can be directly inferred.

After storing, the shuttle preferably leaves the storage channel again.

According to one embodiment of the third method, it is possible to apply the third method to all shuttles of a shuttle system or to all shuttles of one level or to another subset of all shuttles of a shuttle system. Thus, the third method does not necessarily have to be applied to all shuttles of a shuttle system.

Furthermore, it may also be considered to apply the third method only if a second order has been delegated or placed for a storage channel for which an open order is already present. In addition, in such an embodiment, the already open order for this storage channel could be subsequently modified so that only the storage channel, but no longer the storage location, is specified until the shuttle arrives at the channel entrance.

In the context of the third or the second method, at any time before the arrival at the channel entrance or storage channel of the shuttle whose storage location has not been specified in the order, it may be determined that another shuttle has received an order to retrieve a conveyed good in the same channel. If this retrieval order is to be performed before the shuttle whose storage location was not specified in the order is to perform its order, it may be thought of stopping or slowing down the latter shuttle during its travel to the storage channel in such a way that the shuttle with the retrieval order arrives there first.

If the storage channel becomes overcrowded in the context of the third method, for example due to an error, the procedure can be analogous to that already described for the second method. If it is determined by means of the sensor or sensors that all storage locations of the storage channel are occupied, the shuttle can be directed to another storage channel. For this purpose, the shuttle, to which the sensor is preferably attached, can send a corresponding message to the control device, which then assigns the alternative storage channel as feedback.

If the storage channel is not designed as a dead end, it can be considered that two shuttles recognize when they simultaneously enter the same storage channel from opposite channel entrances in order to store their conveyed good there. For this purpose, on-board equipment of the shuttles, in particular at least one corresponding sensor, can be used. If the shuttles detect the situation described above, it may be considered that one of the shuttles stops and the other one stores its conveyed good in a centrally located storage location. The previously waiting shuttle can then store its conveyed good directly adjacent to the conveyed good that has just been stored.

According to a fourth method, the following steps are performed to increase the storage density and/or to prevent blockage situations:

a1. If at least two active or open orders for storage, retrieval or transfer are present for a storage channel, the control device places at least a first and a second active or open order in a sequence.

b1. For a first active or open order (hereinafter referred to as first order), the control device calculates an expected end time of an order runtime or a time at which a shuttle performing this first order is expected to arrive at the channel entrance.

b2. The control device calculates for a second active or open order (subsequent second order) an expected end time of an order runtime or a time at which a shuttle performing this second order is expected to arrive at the channel entrance.

c1. The control device compares the times calculated for both orders according to steps b1 and b2.

d1. If the time for the second order calculated according to step b2 is present before the time for the first order calculated according to step b1, the control device modifies the first order and/or the second order.

The fourth method thus comprises the steps a1, b1, b2, c1 and d1, which are preferably performed in this order.

In the context of the fourth method, the same considerations can apply to the transfer as to the retrieval, since the first step of the transfer usually consists in retrieving the conveyed good to be transferred, which is then stored again at another location.

In the context of the fourth method, therefore, it is preferable to check at any time before or after the order placement whether the intended sequence is likely to be adhered to. If this is not the case, an intervention is made in the context of the modification according to step d1. This can be done once, but if necessary also several times or at regular intervals.

The shuttle performing the first order is subsequently referred to as the "first shuttle". The shuttle carrying out the second order is hereinafter referred to as the "second shuttle". Here, the designations of the shuttles refer only to the orders subdivided into a first and a second order according to steps a1, b1 and b2. The second shuttle is therefore not always the shuttle that actually arrives at the storage channel as the second, i.e. after the first shuttle.

According to a preferred embodiment, the fourth method is applied to exactly two active or open orders, even if more than two open or active orders are present and thus available.

All at least two orders can be either active or open orders. It may also be considered, for example, that the first order is an open order and the second order is an active order or vice versa. If at least one of the orders is an active order, a placement of that order, which then becomes an open order, may occur at any time, in particular before or after any of the steps of the fourth method. If the at least two orders are active orders, the orders that have been sequenced according to the fourth method and modified if necessary are subsequently delegated, i.e. assigned to at least two shuttles.

The orders according to step a1 preferably relate to the same storage channel. Here, the orders can be of such a kind that both specify the storage channel and the storage location in this storage channel for performing the respective storage operation. Alternatively, the storage location can be specified for only one of the two orders, while only the storage channel is specified for the other order.

The fourth method is applicable to multi-deep storage channels. Depending on both orders, i.e. both storage operations to be performed, the fourth method can also be applied to single-depth storage channels.

Preferably, the fourth method results in increasing the storage density in the relating storage channel and preventing blockages. However, it may also be thought of embodiments in which only one of these effects is achieved.

The sequence in step a1 is preferably selected so that the storage density in the relating storage channel is as high as possible when the orders are processed in the sequence. The sequence of the orders is preferably selected here in such a way that no unoccupied storage location remains between two occupied storage locations in the storage channel after the orders have been processed in the order.

However, according to one embodiment, step a1 can also consist solely of providing the two orders with an identifier, for example a number or the like, so that they can be differentiated.

The expected end time of an order runtime according to steps b1 and b2 can be, for example, the time at which the shuttle is expected to leave the storage channel. The expected end time can also be the time, at which the shuttle has performed or begins to perform its storage operation, for example storing or retrieving the conveyed good in the storage channel. A preferred and robust end time in the context of the calculation is the time at which the shuttle is expected to leave the storage channel.

According to one embodiment, the times according to steps b1 and b2 can each be the time at which the respective shuttle is expected to arrive at the channel entrance. A comparison of these points in time can be suitable for avoiding blockage situations and too low storage densities with sufficient probability.

According to an alternative embodiment, the point in time according to step b1 can be the end time at which the first shuttle is expected to leave the storage channel. The point in time according to step b2 can be the expected point in time at which the second shuttle arrives at the channel entrance. A comparison of the aforementioned points in time can be suitable for avoiding blockage situations and too low storage densities in a particularly robust and reliable manner.

The modification according to step d1 can be done in different ways.

In the context of a first modification, the order run times can be extended or shortened in various ways as described below, so that the shuttles reach the storage channel in the sequence according to step a1.

In the context of the first modification, it may be considered to modify the second order in such a way that the point in time mentioned in step b2 is later than the point in time mentioned in step b1. For this purpose, for example, the travel time of the second shuttle can be extended so that it arrives later at the channel entrance. For example, a speed of the second shuttle can be reduced. Alternatively, the second shuttle may be stopped for a period of time during its travel to the channel entrance; wherein stopping to recharge the energy storage may be contemplated. Stopping and reducing speed can also be done in the sense of indirectly modifying the second order, for example, by modifying right-of-way rules affecting the second shuttle so that it slows or stops at least once during its trip to the storage channel. If the second order has not yet been delegated and is therefore an active order and not an open order, the second order can be delegated so late, i.e. converted into an open order, that the point in time specified in step b2 is later than the point in time specified in step b1.

As described above, the modification of the second order may be direct or indirect. A direct modification may be preferred.

Alternatively or additionally, in the context of the first modification, it may be thought of directly or indirectly modifying the first order so that the point in time mentioned in step b2 is after the point in time mentioned in step b1. In the context of an indirect modification of the first order, it may be thought of modifying the right-of-way rules in such a way that the first shuttle is not, or less frequently, decelerated and/or slowed down while traveling to the storage channel.

In the context of a direct modification, for example, a speed of the first shuttle can be increased. Furthermore, at least one scheduled stop of the first shuttle can be omitted. Furthermore, the first order can be delegated to the first shuttle earlier than originally planned, if this has not already been done.

In the case of the modifications described above, which result in the point in time mentioned in step b2 being after the point in time mentioned in step b1, the modifications can additionally be performed in such a way that there is a predetermined minimum period of time, i.e. a temporal minimum interval, between the two aforementioned points in time. This can be in the range of one or more seconds, for example, 5 seconds, 10 seconds, 20 seconds or 30 seconds; up to a time period of approximately one minute or more. The length of the minimum interval may depend on numerous factors, such as the number of shuttles in the rack, the frequency of blockage situations in the past or a modeled expected frequency of blockage situations in the shuttle system, or the like.

In the context of a second modification of the first and second order, it can be considered that the orders are swapped so that the first shuttle performs the second order after the swap and vice versa. Such an exchange is particularly conceivable if the storage operations to be performed according to the two orders are identical, i.e. both orders are either retrieval operations or storing operations.

The orders are then processed in reverse order according to the modification described above, i.e. the associated storage operations in the storage channel are also performed in reverse order. According to an embodiment, it can be considered that after performing the swap described above at least one of the orders is modified again, so that a temporal minimum interval lies between the points in time according to steps b1 and b2. This can be done in the manner already described above.

A third modification of the first and/or the second order may consist of modifying at least one of the aforementioned orders in such a way that the associated shuttle is assigned an alternative storage location, possibly in a different storage channel. Preferably, only one of the orders is modified in this manner. Preferably, this modification is used for orders comprising the storage operation "storing".

In an embodiment of the fourth method, preferably at least one of the modifications described above, i.e. the first, the second or the third modification, is used. The present invention thus also includes a fourth method in which only one or only two of the three modifications described above are available.

If, according to one embodiment of the fourth method, at least two of the three modifications described above are available, it may be considered that a selection of the modification to be performed in the context of step d1 is made in the manner described below.

First of all, it may be considered to make the modification to be performed dependent on the storage operations to be carried out according to the order or at least to limit it with respect to these storage operations:

The variants of the first modification described above, i.e. an adjustment of the order run times, can be applied regardless of whether both orders are the same storage operation. The variants of the second modification, i.e. an order swap, can generally only take place if both orders specify the same storage operation, i.e. either storing or retrieving in each case. The third modification, i.e. the assignment of an alternative storage location, can usually be performed with regard to orders that prescribe storing, provided that the conveyed good to be stored does not have to be taken over by the other shuttle through subsequent retrieval.

It may be thought of making the modification dependent solely on the storage operations to be carried out in accordance with the order. For example, the second modification can always be performed if it is possible in view of the storage operations to be performed according to the order. If this is not the case, it may be considered to switch to the third modification or to the first modification, wherein here again the third modification can be preferably carried out.

Furthermore, it may be considered not to make the modification solely dependent on the storage operations to be performed according to the order. Instead, only a selection of the available modifications can be made depending on the storage operations to be performed. If several modifications are available for a given combination of storage operations according to the order, it may be considered to carry out the first modification whenever the time interval between the points in time according to steps b1 and b2 is below a maximum length. Thus, only minimal interventions are made in the orders and, at the same time, longer delay or standstill times are avoided. Furthermore, it can be considered to select the first modification with a standstill for charging the energy storage whenever the energy storage of the shuttle in question is below a predefined charging or filling state.

If, on the other hand, the time interval between the points in time according to steps b1 and b2 is above a maximum length, it may be considered to perform, for example, the second or third modification instead of the first modification. In particular, according to an embodiment, the third modification can only be used when the time interval between the points in time according to steps b1 and b2 is above a maximum length, since the third modification represents a significant intervention in an operating dynamic of the storage. This is particularly true if the shuttle in question is assigned an alternative storage location in an alternative storage channel in the context of the third modification.

In addition to step d1, the fourth method may comprise the following step d2:

d2. If the point in time calculated according to step b2 for the second order is after the point in time calculated according to step b1 for the first order, and if a time period between the aforementioned points in time falls below a predetermined minimum length, the control device modifies the first and/or the second order. This modification is preferably performed as described above for the first modification with respect to step d1.

During the calculation of the expected points in time to be performed by the control device, the orders do not yet have to be delegated. However, in this step the control device can, for example, select shuttles that are already waiting or moving in the storage but not performing an open order, and calculate the expected points in time taking into account their position and the resulting travel time. In the same way, the control device could also use shuttles moving in the storage, which are currently performing an open order, if the calculation takes into account the remaining duration of these open orders.

The steps of the fourth method are preferably performed when several active orders, for example orders for storing, retrieving or transferring a conveyed good, are present relating to a single, i.e. the same, storage channel.

According to an embodiment of the fourth method, the time interval is extended if it has been determined that its length is below the minimum length.

In addition to the methods described above, the present invention comprises a shuttle system comprising a control device, wherein the shuttle system comprises a rack having a driveway and a storage channel, preferably having multiple depths, with at least two storage locations, wherein the shuttle system further comprises at least two shuttles, wherein the shuttles are arranged for storing, retrieving or transferring conveyed goods, wherein the shuttles receive orders for storing, retrieving or transferring a conveyed good from the control device, wherein the control device for preventing a blockage situation and for increasing a storage density is arranged to perform the method steps according to at least one of the methods described above, in particular according to the first, the second, the third or the fourth method according to the invention.

Features and details described above with regard to the methods according to the invention apply analogously also to the shuttle system according to the invention.

BRIEF DESCRIPTION OF THE DRAWINGS

Further advantages, features and details of the invention result from the following description of embodiments and from the drawings.

FIGS. 8 and 9 generally illustrate details of embodiments of the fourth method according to the present invention.

DETAILED DESCRIPTION

Figure 1:
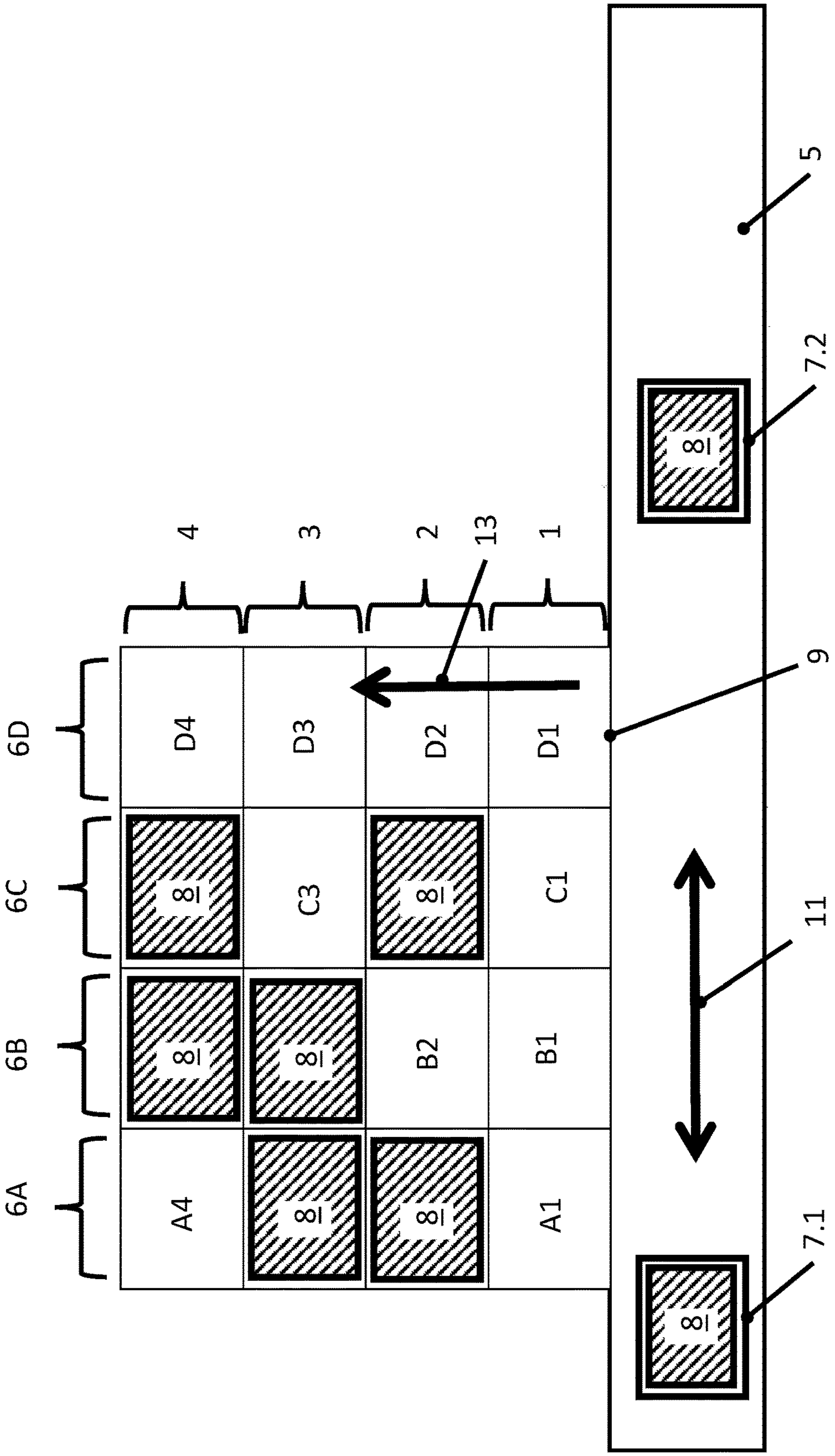
FIGS. 1 to 3 generally illustrate sections of a shuttle system for performing the methods according to embodiments of the present invention.
Figure 2:
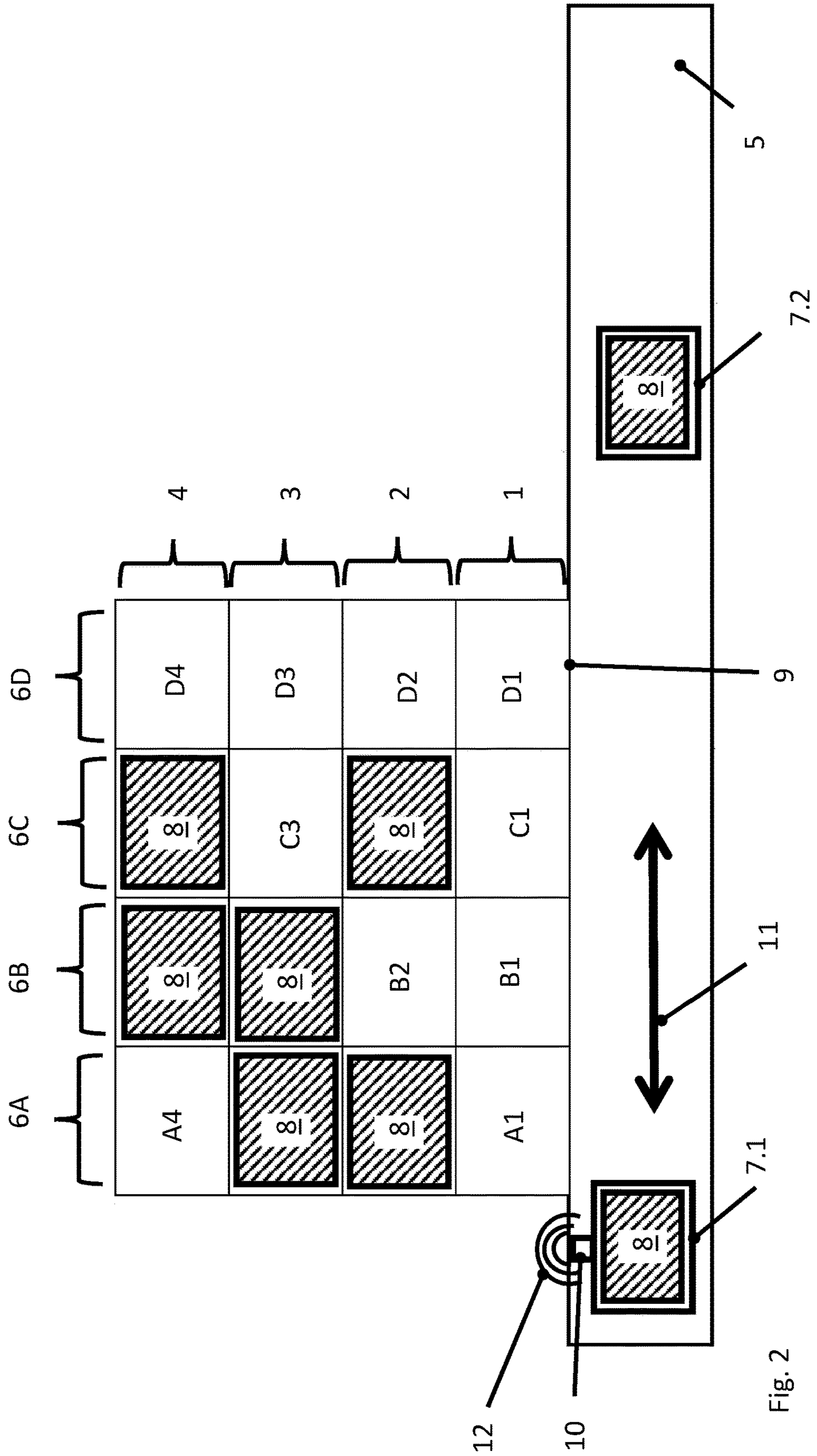
Figure 3:
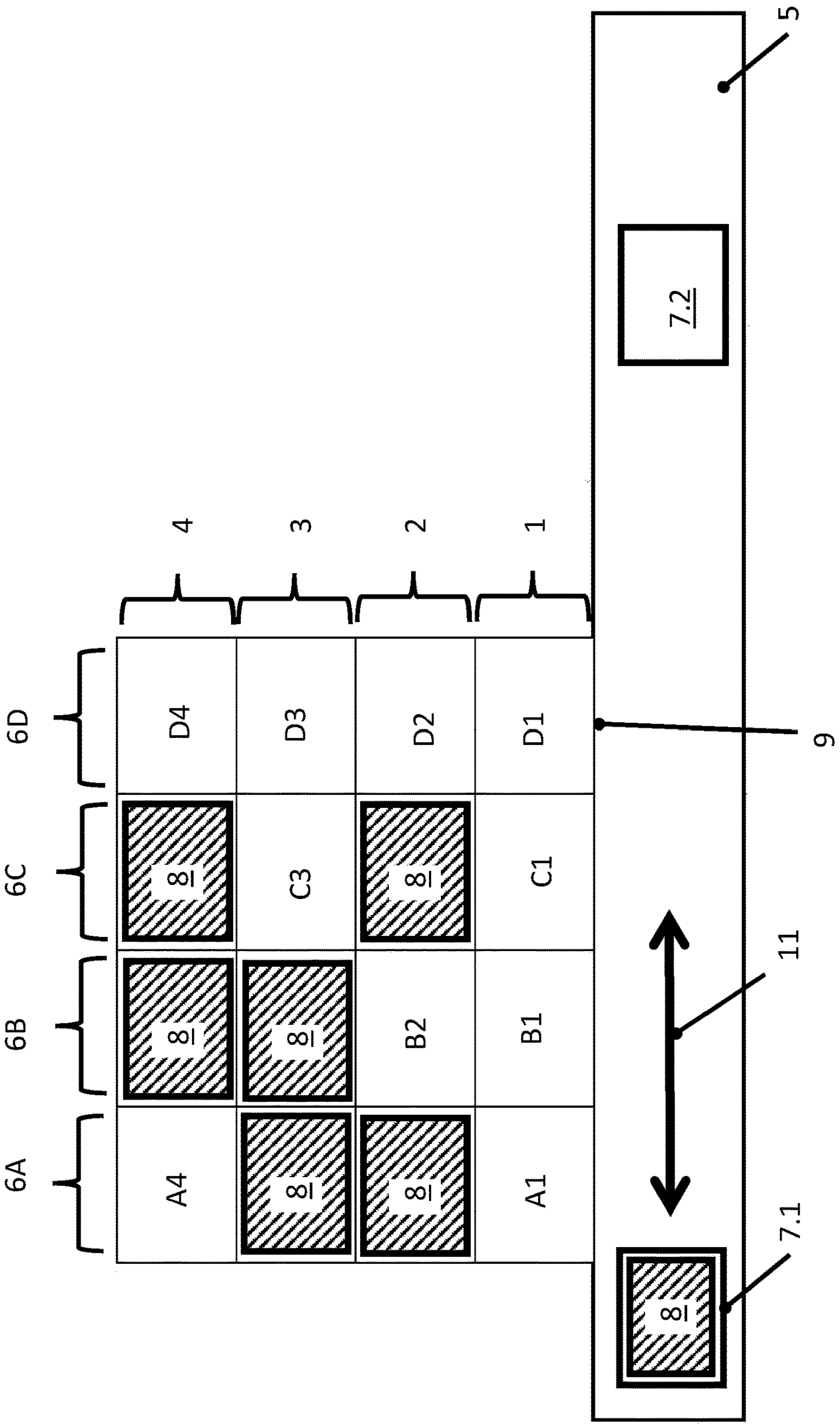

FIGS. 1 to 3 each show a section of a shuttle system. The driveway 5 and two shuttles 7.1, 7.2 located thereon can be seen, as well as several conveyed goods 8 on some of the shuttles 7.1, 7.2 shown. Running substantially orthogonal to a direction of travel 11 of the shuttles 7.1, 7.2 on the driveway 5 are storage channels 6A, 6B, 6C, 6D, each having four storage locations D1, . . . , D4; C1, . . . , C4; B1, . . . , B4; A1, . . . , A4. The storage locations A1, B1, C1 and D1 correspond to the storage depth 1, the storage locations A2, B2, C2, D2 correspond to the storage depth 2, etc. An entry direction 13 is indicated in FIG. 1.

Between the storage locations A1, . . . , D1 of the storage depth 1 and the driveway 5 there are channel entrances 9, wherein for the sake of clarity only the channel entrance 9 of the storage channel 6D is provided with a reference number.

In FIG. 2, the shuttle 7.1 is provided with a sensor 10, which will be explained in more detail with respect to the third method and is shown with indicated shafts 12.

Figure 8:
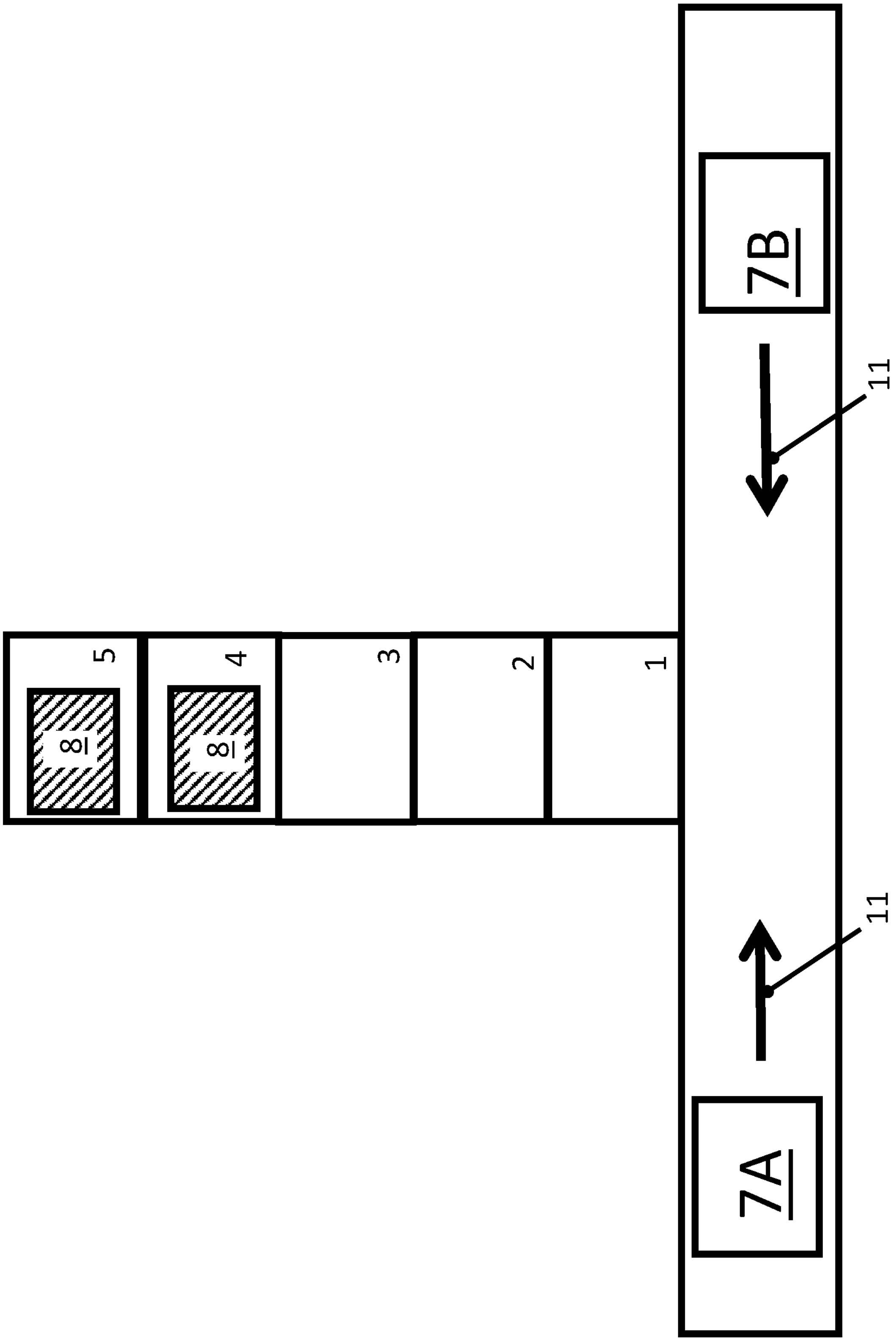

FIG. 8 shows a schematic view of a storage channel with five storage locations and two shuttles 7A, 7B, which control this storage channel.

FIG. 9 shows a matrix, which, in conjunction with FIG. 8, illustrates possible impending problems as well as the solutions offered by the three possible modifications of the orders according to the embodiments of the fourth method. There are shown 9 cases #1, . . . , #9. The storage operations of shuttles 7A and 7B from FIG. 8 are specified in terms of type and storage location: "ON;3" means, for example, that storage is to be made in storage location 3 (according to FIG. 8) as ordered.

FIGS. 8 and 9 are used to consider a scenario where the shuttles 7A and 7B are to perform orders for the same storage channel, wherein according to the order, the first shuttle 7A should arrive at the storage channel first, but does not do so, for example, due to interference or delay. Instead, the second shuttle 7B, which should actually arrive at the storage channel after the first shuttle 7A, arrives there first.

Impending too low storage densities or blockage situations are thus considered in the event that shuttles 7B and 7A perform or attempt to perform their storage orders in the order in which they arrive at the storage channel.

The first modification is marked with "1", the second modification is marked with "2" and the third modification is designated "3".

With reference to FIGS. 1 to 9, the operation of the device according to the invention is explained as follows:

The shuttles 7.1, 7.2 usually travel along a direction of travel 11 on the driveways 5. Over the channel entrances 9, the shuttles 7.1, 7.2 can enter the storage channels 6A, 6B, 6C, 6D orthogonally to the direction of travel 11. These are usually structurally separated from each other in such a way that, for example, a shuttle 7.1, 7.2 located in storage location D1 at storage depth 1 cannot move parallel to the direction of travel into the neighboring storage location C1.

In known methods for operating such a shuttle system, the situation could arise in the configuration shown in FIGS. 1 and 2 that shuttle 7.1 has an order to store for storage location B1 and shuttle 7.2 has an order to store for storage location B2. If now, as shown in FIGS. 1 and 2, shuttle 7.1 arrives at storage channel 6B before shuttle 7.2 and stores the loaded conveyed good 8 in a storage location B1, a blockage situation occurs. Shuttle 7.2, which arrives later, cannot store the loaded conveyed good 8 in a storage location B2 because it cannot get past the conveyed good 8 of shuttle 7.1 that has already been unloaded in a storage location B1 without a transfer.

All methods according to the present invention can prevent the blockade situation described above.

If the shuttle system is operated according to the first method, a blockage situation is basically excluded, since the shuttles 7.1 and 7.2 would never be traveling simultaneously with orders relating to the same storage channel 6B.

If the shuttle system is operated according to the second or third method, such a blockage situation cannot occur, since the shuttle 7.1 is only informed of the free storage location B2 immediately before or during its entry into the storage channel 6B. According to these methods, the shuttle arriving first at the storage channel 6B would therefore not store the conveyed good 8 in the storage location B1, but would be assigned the free storage location B2 within the storage channel 6B furthest away from the driveway 5 or would find it with the aid of the sensor 10.

If the shuttle system is operated according to the fourth method, the control device would, for example, have either ensured in advance by means of an appropriate calculation and, if necessary, the addition of a time buffer that the shuttle 7.2 would arrive first at the storage channel 6B in order to store the conveyed good in a storage location B2; or it would have assigned the storage location B2 to the shuttle 7.1 if it had been foreseeable that the shuttle 7.1 would arrive first at the storage channel 6B.

In the same way, the four methods described above also prevent the occurrence of empty storage locations A4, C3. As explained at the beginning, in known methods it could have happened that shuttle 7.1 arrives with an order for storing in storage location B1 before shuttle 7.2, which has an order for storing in storage location B2. Also in this situation, an empty storage location, namely B2, would have been created. However, the methods described above according to the present invention prevent this empty storage location.

In known methods of operating such a shuttle system, the situation could arise in the configuration shown in FIG. 3 where shuttle 7.1 has an order to store in one of the storage locations B1 or B2, while the order of the unloaded shuttle 7.2 is to retrieve the conveyed good 8 from storage location B3. In this situation, as shown in FIG. 3, if shuttle 7.1 arrives first at storage channel 6B and performs its task, shuttle 7.2, which arrives later, will not be able to perform its retrieval task because it will not be able to pass the conveyed good placed in a storage location B1 or B2, which was previously placed there by shuttle 7.1. A blockade situation could therefore occur. The unloaded shuttle 7.1 would therefore have to receive an order to transfer the conveyed good deposited in a storage location B1 or B2 before it can perform its retrieval order relating to the conveyed good 8 in a storage location B3.

In particular, the first and the fourth methods according to the present invention can prevent the blockage situation described above with respect to FIG. 3 in the manner already described with respect to FIGS. 1 and 2.

Figure 4:
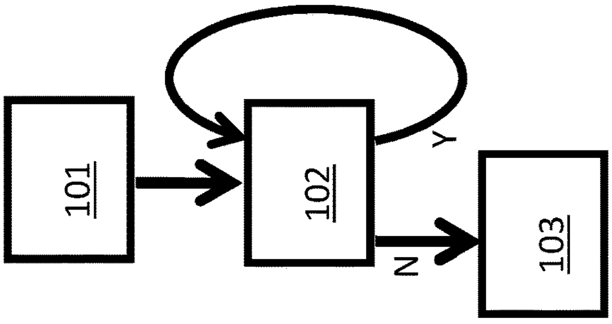

FIG. 4 shows a flow diagram of an embodiment of a first method according to the present invention with the following method steps:

Method step 101: An active order with respect to a storage channel is present, in particular in the control device.

Method step 102: The control device checks whether an open order relating to the same storage channel is present.

N: If the check indicates or shows that there is no open order relating to the same storage channel, then process step 103 follows.

Y: If the check reveals that an open order relating to the same storage channel is present, then process step 102 is repeated.

Method step 103: The control device assigns the active order from step 101 to a shuttle; the previously active order is thus open.

Figure 5:
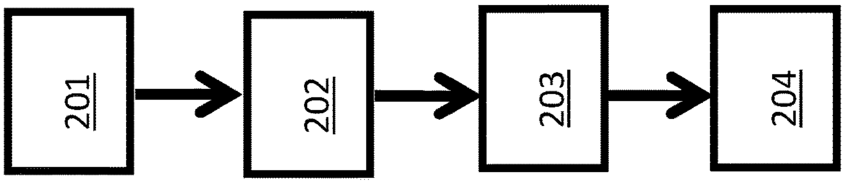

FIG. 5 shows a flow chart of an embodiment of a second method according to the present invention with the following method steps:

Method step 201: A shuttle receives an order for storing a conveyed good, wherein this order specifies the storage channel but not the storage location.

Process step 202: The shuttle reaches the channel entrance of the storage channel according to the order.

Method step 203: The shuttle receives a specification of the order regarding the storage location to be selected within the storage channel for storage.

Method step 204: The shuttle stores the conveyed good in a storage location specified in method step 203.

Figure 6:
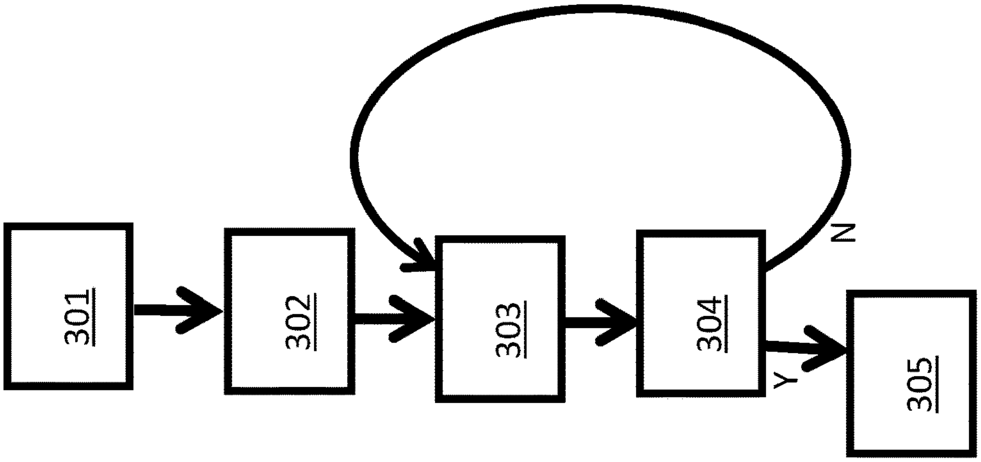
FIGS. 4 to 7 generally illustrate flow diagrams of embodiments of four methods according to the present invention.

FIG. 6 shows a flow chart of an embodiment of a third method according to the present invention with the following method steps:

Method step 301: A shuttle receives an order for storing a conveyed good, wherein this order specifies the storage channel but not the storage location.

Method step 302: The shuttle reaches the channel entrance of the storage channel as ordered and enters this storage channel.

Method step 303: The shuttle moves forward in the storage channel in the entry direction.

Method step 304: The shuttle uses a sensor to check whether an occupied storage location is present in the entry direction.

N: If the check indicates or shows that there is no occupied storage location in the entry direction, method steps 303 and 304 are repeated.

Y: If the check reveals that an occupied storage location is present in the entry direction, method step 305 follows.

Method step 305: The shuttle stores the conveyed good in the last free storage location in the entry direction before the occupied storage location detected in method step 304.

Figure 7:
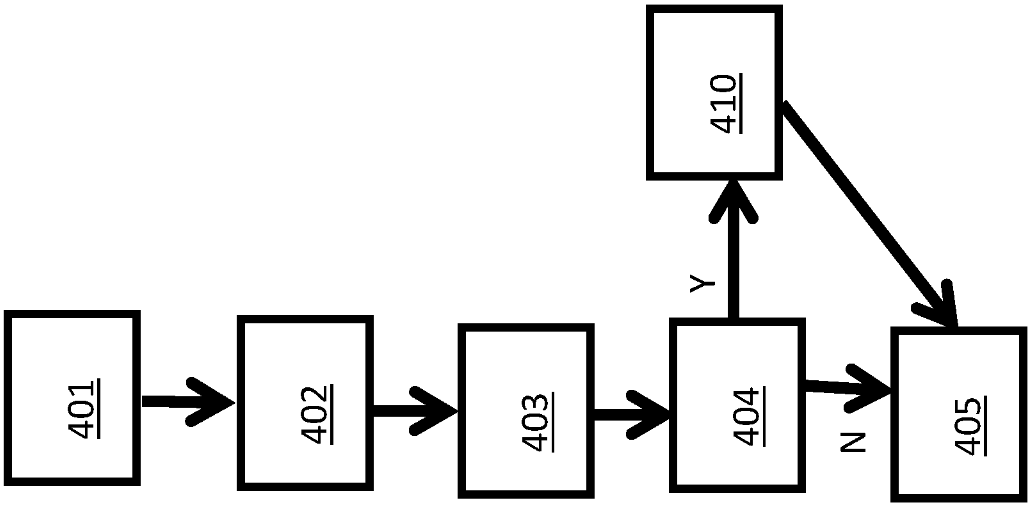

FIG. 7 shows a flow diagram of an embodiment of a fourth method according to the present invention with the following method steps:

Method step 401: There is a first active order and a second active order relating to the same storage channel.

Method step 402: The control device arranges the active orders in a sequence in such a way that, after the orders have been processed in this sequence, no unoccupied storage location remains between two occupied storage locations in the relating storage channel.

Method step 403: The control device calculates for the first active order an expected end point in time of an order run time and for the second active order an expected point in time at which a second shuttle performing this second active order is expected to arrive at the channel entrance.

Method step 404: The control device checks whether a time interval between the expected end time of the first active order and the expected arrival of the shuttle performing the second order at the channel entrance falls below a specified minimum length.

Y: If the check indicates or shows that the time is less than the specified minimum length, step 410 follows.

N: If the check indicates or shows that the length is not less than the specified minimum length, step 405 follows.

Method step 405: The control device assigns the orders to the shuttles.

Method step 410: The control device modifies the second active order in such a way that a time interval with the specified minimum length is expected to lie between the departure from the storage channel by a first shuttle performing the first order and the arrival at the channel entrance of the second shuttle performing the second order.

In the nine lines of FIG. 9, nine cases #1, . . . , #9 are shown in relation to the two shuttles 7A, 7B in FIG. 8 and the storage channel shown there, in which two conveyed goods 8 are stored in a storage location 4 and 5. The nine cases in FIG. 9 also partly refer to a situation in which at least one of the shuttles 7A, 7B is loaded with a conveyed good to be stored. For the sake of clarity, however, this is not shown in FIG. 8.

From FIGS. 8 and 9, it is easy to see the situation that occurs when, according to the order, the first shuttle 7A was scheduled to arrive at the storage channel first, but the second shuttle 7B actually arrives there first.

For each of the cases #1 ff. shown, FIG. 9 indicates whether the first shuttle 7A is to store or retrieve ("ON" or "OFF"). Furthermore, it is indicated in which storage location the storage operation is to be performed (e.g. "3" or "4"), or whether only the storage channel, but not the storage location, was specified ("X") as ordered. The same applies to the second shuttle 7B.

In the cases marked with "X", the method steps of the second or third method according to the present invention can be applied. Here, in some cases, if the method steps of the second and third methods are not applied to the first and second shuttles 7A, 7B, a blockage situation or too low storage densities can still be present. Such a situation can be solved by the fourth method.

FIG. 9 also shows which of the three modifications considered in the context of the fourth method can prevent the impending blockage situation and the impending too low storage densities.

According to case #1, the first shuttle 7A is supposed to store its conveyed good (not shown in FIG. 8) in any of the storage locations 1 to 3; the second shuttle 7B is supposed to store its conveyed good (not shown in FIG. 8) in storage location 2. If the second shuttle 7B arrives first at the channel entrance and stores according to the order without modification, storage location 3 remains empty; the storage density is too low. The first shuttle arriving later would store its conveyed good in storage location 1.

Adjusting the order run times in the sense of a variant of the first modification could avoid the impending of too low storage densities. The first modification could in fact ensure that, as originally intended, the first shuttle 7A arrives first at the storage channel. The first shuttle 7A would then store in storage location 3, the second shuttle 7B in storage location 2.

The same result could be achieved by an order swap in the sense of the second modification: The second shuttle 7B would then be storing in storage location 3, the first shuttle 7A in storage location 2.

An alternative storage location assignment in the sense of the third modification could also avoid the impending of too low storage densities. For this, the shuttle 7B would have to be assigned a storage location outside the storage channel shown in FIG. 8. The "too fast" shuttle 7B would therefore have to move to a different storage channel.

According to case #2, in addition to the explanations for case #1, a blockade situation would occur upon arrival of the "too late" first shuttle 7A, because the first shuttle 7A cannot travel to the intended storage location 3 according to the order. Finally, the second shuttle 7B has already stored its conveyed good at the storage location 2. However, the modifications discussed with respect to case #1 would also prevent this blockage situation.

Herein, in case #2, an alternative storage location assignment could also be performed for the first shuttle 7A instead of the second shuttle 7B, wherein the "late" arriving shuttle 7A is referred to an alternative storage location in a different storage channel or to storage location 1 in the same storage channel. However, this would only solve the blockage situation, and the too low storage densities would remain. This may be acceptable in some cases, however, because the too low storage density often causes fewer problems than a blockage situation, especially a permanent blockage situation.

The blockage situation occurring in case #2 (without modification) would be permanent, i.e. would not end when the "delayed" first shuttle 7A arrives at the storage channel. Without modification, the blockage situation could only be solved by reversing the storage operation of the "too early"—or "non delayed" compared to shuttle 7A—second shuttle 7B.

According to case #3, the second shuttle 7B can store in any storage location, while the first shuttle 7A is supposed to store in storage location 3. The first arriving second shuttle 7B will therefore store in storage location 3 and block the later arriving first shuttle 7A because its storage location 3 assigned according to the order is occupied. However, there is no danger of too low storage densities because storing in storage location 3 does not create an unoccupied storage location between two occupied storage locations.

The blockade situation occurring in case #3 is permanent, so it is not automatically solved by the arrival of the first shuttle 7A.

If the modifications discussed for cases #1 and #2 are applied to the constellation according to case #3, the impending blockade situation will not occur there either.

As already discussed for case #2, also for case #3 the alternative storage location assignment could be performed for the first shuttle 7A instead of the second shuttle 7B. In this case, too low storage densities occur in case #3 because the first shuttle 7A arriving "too late" could, for example, be storing in storage location 2 after an alternative storage location assignment, while the second shuttle 7B arriving "too early" has already stored in storage location 3.

Case #4 relates to a constellation, which has been included in the matrix according to FIG. 9 only for the sake of clarity. Case #4 does not require any modification of the order according to the fourth method, because neither too low storage densities nor a blockage is impending. Rather, it is a constellation, in which the first shuttle 7A and the second shuttle 7B approach the storage channel according to the second or the third method of the present invention without the storage location being specified in advance. Case #4 thus shows, that the third and fourth methods can reliably prevent too low storage densities and impending blockages, in particular if these methods are applied at least as soon as several orders have been placed for a single storage channel, i.e. are open.

Cases #5 and #6 relating to the rather rare constellation where the conveyed good to be stored by the first shuttle 7A is supposed to be immediately retrieved by the second shuttle 7B. This can occur, for example, during a stock transfer. If the first shuttle arrives too late at the storage channel, the second shuttle B cannot fulfill its order.

If the second shuttle 7B arriving "too early" (or "not delayed") does not wait or get stuck in the storage channel and does not block the channel entrance, the blockage situation is only temporary. However, even a temporary blockage situation can last long enough to cause a lasting disruption in the operation of the shuttle system or a noticeable decrease in its efficiency. Therefore, it is advantageous to prevent even temporary blockade situations by a modification in the sense of the fourth method.

In this case, only the first modification can provide a remedy when cases #5 and #6 occur.

In case #7, according to step a1, it is planned that the first shuttle 7A makes the storage location 4 accessible by removing the conveyed good 8 stored there, so that the second shuttle 7B can place or store its conveyed good there. Here, although the storage densities are not too low, an at least temporary blockade situation occurs because the first arriving second shuttle 7B can only perform its order after the late shuttle 7A has performed its order.

As with all cases #1 to #3 and #5 to #9, where a blockage situation and/or too low storage densities are impending, an application of the first modification in the context of the fourth method may provide a remedy.

In case #7, it is further possible to assign an alternative storage location in a different storage channel to the second shuttle 7B in the context of the third modification. Only if this alternative storage location is not in the same storage channel as the first shuttle 7A, the latter, after arriving late at this storage channel, can still perform its retrieval operation without being prevented from doing so by the conveyed good deposited by the second shuttle 7B.

In case #8, thanks to its flexible order, i.e. specified only with respect to the storage channel, the second shuttle can easily store the conveyed good to be stored in a storage location 3 before the first shuttle 7A arrives. However, a permanent blockage situation is then present, since the first shuttle 7A, if it arrives late at the storage channel, cannot get to the storage location 4.

The blockage situation in case #8 can be solved in the manner already described for case #7 by the modifications described there.

In case #9, an only temporary blockage situation occurs if the first shuttle 7B arriving at the storage channel does not block the storage channel or its channel entrance, so that the first shuttle 7A arriving later can perform its retrieval order.

In order to solve the temporary blockage situation, the second modification is also possible in addition to the first modification. Namely, if the first arriving second shuttle 7B retrieves the conveyed good stored in storage location 4 and the later arriving first shuttle 7A retrieves the conveyed good stored in storage location 5, no blockage situation occurs.

Although only some preferred embodiments of the invention have been described and illustrated, it is obvious that the skilled person can add numerous modifications without leaving the essence and scope of the invention.

The specification in method step 203 in FIG. 4 can be performed centrally, for example by the control device, or decentrally.

The method steps 303 and 304 in FIG. 6 can be performed sequentially as shown or simultaneously.

The method step 305 in FIG. 6 can be followed by an optional method step 306 (not shown) if no storage location is available in the storage channel due to an error. According to this step 306, an alternative storage channel can be assigned to the shuttle.

The method step 305 in FIG. 6 can also be followed by a method step 307 (not shown), which comprises a communication of the position of the shuttle when depositing, thus a communication of a position of the stored conveyed good, for example to the control device.

The sensor 10 shown in FIG. 2 does not have to work with waves 12, but can also work with beams or otherwise.

The section shown in FIGS. 1 to 3 shows only some parts of a driveway 5 and some of the storage channels 6A, . . . , 6D of a level. Usually existing parallel driveways 5 as well as connecting paths between these driveways 5, further storage channels 6 as well as further shuttles 7 and further levels comprising the aforementioned components are not shown for the sake of clarity, but are present in embodiments of the present invention.

All shuttles 7 can be equipped with the sensor 10 shown in FIG. 2, although this has only been drawn in for shuttle 7.1 in FIG. 2. In particular, sensors which are usually already used as on-board equipment of known shuttles can be used.

Reference throughout the specification to "examples, "in examples," "with examples," "various embodiments," "with embodiments," "in embodiments," "preferable" or "in particular" elements/features, or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," "preferable" or "in particular" elements/features, or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

The invention claimed is:

1. A method for operating a shuttle system by a control device, wherein the shuttle system comprises a rack with a driveway and a multi-deep storage channel with at least two storage locations, wherein the shuttle system comprises at least two shuttles, wherein the at least two shuttles are arranged to store, retrieve, or transfer conveyed goods, wherein the at least two shuttles receive orders for storing, retrieving, or transferring a conveyed good from the control device, and wherein, to prevent a blockage situation and/or to increase a storage density, the method comprising:

upon receipt, by the control device, of an active order for storing, retrieving, or transferring a conveyed good in a specific storage channel, determining, by the control device, whether at least one open order for storing, retrieving, or transferring in the specific storage channel is present;

if no open order is present for the specific storage channel, assigning, via the control device, the active order to a first shuttle of the at least two shuttles; and if an open order is present, either:

(i) assigning, via the control device, the active order only after the open order has been completed, or (ii) modifying, via the control device the active order so that a storage channel is selected for which no open order is present.

2. A method for operating a shuttle system by a control device, wherein the shuttle system comprises a rack with a driveway and a multi-deep storage channel with at least two storage locations, wherein the shuttle system comprises at least two shuttles, wherein the at least two shuttles are arranged to store, retrieve, or transfer conveyed goods, wherein the at least two shuttles receive orders for storing, retrieving, or transferring a conveyed good from the control device, and wherein, to prevent a blockage situation and/or to increase a storage density, the method comprising:

a shuttle receives, via the control device, an order for storing a conveyed good, wherein the order specifies the storage channel to be approached, but not the storage location; and immediately before the shuttle enters the storage channel, the order is specified, via the control device, such that the shuttle is informed of the storage location in which the conveyed good is to be stored.

3. A method for operating a shuttle system by a control device, wherein the shuttle system comprises a rack with a driveway and a multi-deep storage channel with at least two storage locations, wherein the shuttle system further comprises at least two shuttles, wherein the at least two shuttles are arranged to store, retrieve, or transfer conveyed goods, wherein the at least two shuttles receive orders for storing, retrieving, or transferring a conveyed good from the control device, wherein, to prevent a blockage situation and/or to increase a storage density, the method comprising:

a shuttle receives, via the control device, an order for storing a conveyed good, wherein the order specifies the storage channel to be approached, but not the storage location;

the shuttle enters the storage channel and subsequently moves within the storage channel;

during the subsequent movement, a sensor checks whether the storage locations located in front of the shuttle are free or occupied;

if the sensor detects an occupied storage location, the conveyed good is stored in the free storage location directly adjacent to the occupied storage location; and if the sensor does not detect an occupied storage location, the conveyed good is stored in the last storage location in an entry direction within the storage channel in case of a storage channel designed as a dead end; in the case of a storage channel with two channel entrances, the conveyed good is stored in a storage location located in a middle of the storage location or in the last storage location in entry direction.

4. A method for operating a shuttle system by a control device, wherein the shuttle system comprises a rack with a driveway and a multi-deep storage channel with at least two storage locations, wherein the shuttle system further comprises at least two shuttles, wherein the at least two shuttles are arranged to store, retrieve, or transfer conveyed goods, wherein the at least two shuttles receive orders for storing, retrieving, or transferring a conveyed good from the control device, wherein, to prevent a blockage situation and/or to increase a storage density, the method comprising:

a1. if at least two active or open orders for storing, retrieving, or transferring are present for a storage channel, the control device places at least a first and a second active or open order in a sequence;

b1. for a first active or open order, the control device calculates an expected end point in time of an order run time or a point in time at which a shuttle performing this first order is expected to arrive at the channel entrance;

b2. the control device calculates for a second active or open order an expected end point in time of an order run time or a point in time at which a shuttle performing this second order is expected to arrive at the channel entrance;

c1. the control device compares the points in time calculated for both orders according to b1 and b2; and d1. if the point in time calculated according to b2 for the second order is present before the point in time calculated according to b1 for the first order, the control device modifies the first order and/or the second order.

5. The method according to claim 2, wherein the shuttle is informed by the control device about the storage location where the conveyed good is supposed to be stored.

6. The method according to claim 2, wherein the shuttle is informed by a routing system about the storage location where the conveyed good is supposed to be stored.

7. The method according to claim 3, wherein the sensor is attached to the shuttle.

8. A shuttle system comprising a control device, wherein the shuttle system comprises a rack having a driveway and a multi-deep storage channel with at least two storage locations, wherein the shuttle system further comprises at least two shuttles, wherein the at least two shuttles are arranged to store, retrieve, or transfer conveyed goods, wherein the at least two shuttles receive orders for storing, retrieving, or transferring a conveyed good from the control device, wherein the control device is set to perform the method according to claim 1.

* * * * *